(12) United States Patent
Ver Hage et al.

(10) Patent No.: US 6,953,266 B1
(45) Date of Patent: Oct. 11, 2005

(54) ANIMAL CAGE LIGHTING SYSTEM AND METHOD

(76) Inventors: Richard Ver Hage, 95 Oakdale Ct., North Haledon, NJ (US) 07508; Glenn Ver Hage, 39 Hill St., Midland Park, NJ (US) 07432

( * ) Notice: Subject to any disclaimer, the term of this patent is extended or adjusted under 35 U.S.C. 154(b) by 0 days.

(21) Appl. No.: 10/400,277

(22) Filed: Mar. 27, 2003

Related U.S. Application Data

(60) Provisional application No. 60/368,110, filed on Mar. 27, 2002.

(51) Int. Cl.[7] ............... F21V 33/00; A01K 31/06
(52) U.S. Cl. ............. 362/253; 362/551; 362/234; 362/800; 119/452; 119/455
(58) Field of Search ............... 362/227, 154, 362/230, 234, 253, 551, 800; 119/452, 459, 119/428, 248, 417, 418, 455, 578; 220/84, 220/83

(56) References Cited

U.S. PATENT DOCUMENTS

| | | | | |
|---|---|---|---|---|
| 4,448,150 A | * | 5/1984 | Catsimpoolas | 119/455 |
| 5,083,558 A | * | 1/1992 | Thomas et al. | 128/202.12 |
| 6,637,372 B2 | * | 10/2003 | Mauderli et al. | 119/417 |
| 6,810,833 B2 | * | 11/2004 | Bonner et al. | 119/455 |
| 2004/0012959 A1 | * | 1/2004 | Robertson et al. | 362/247 |

* cited by examiner

*Primary Examiner*—Sandra O'Shea
*Assistant Examiner*—Bao Q. Truong
(74) *Attorney, Agent, or Firm*—W. Patrick Quast, Esq.

(57) ABSTRACT

A system and method for illuminating individual animal cages secured in a multiple cage rack is described. A first lighting system makes use of LEDs secured on the frame of a multiple cage rack; or attached to or disposed in each individual cage. A second lighting system utilizes fiber optic cables connected to or adjacent each individual cage or disposed within. Clear observation of all animals at will is economically provided without interference with normal cleaning and sterilizing procedures, utilizing the virtually maintenance free lighting system.

21 Claims, 9 Drawing Sheets

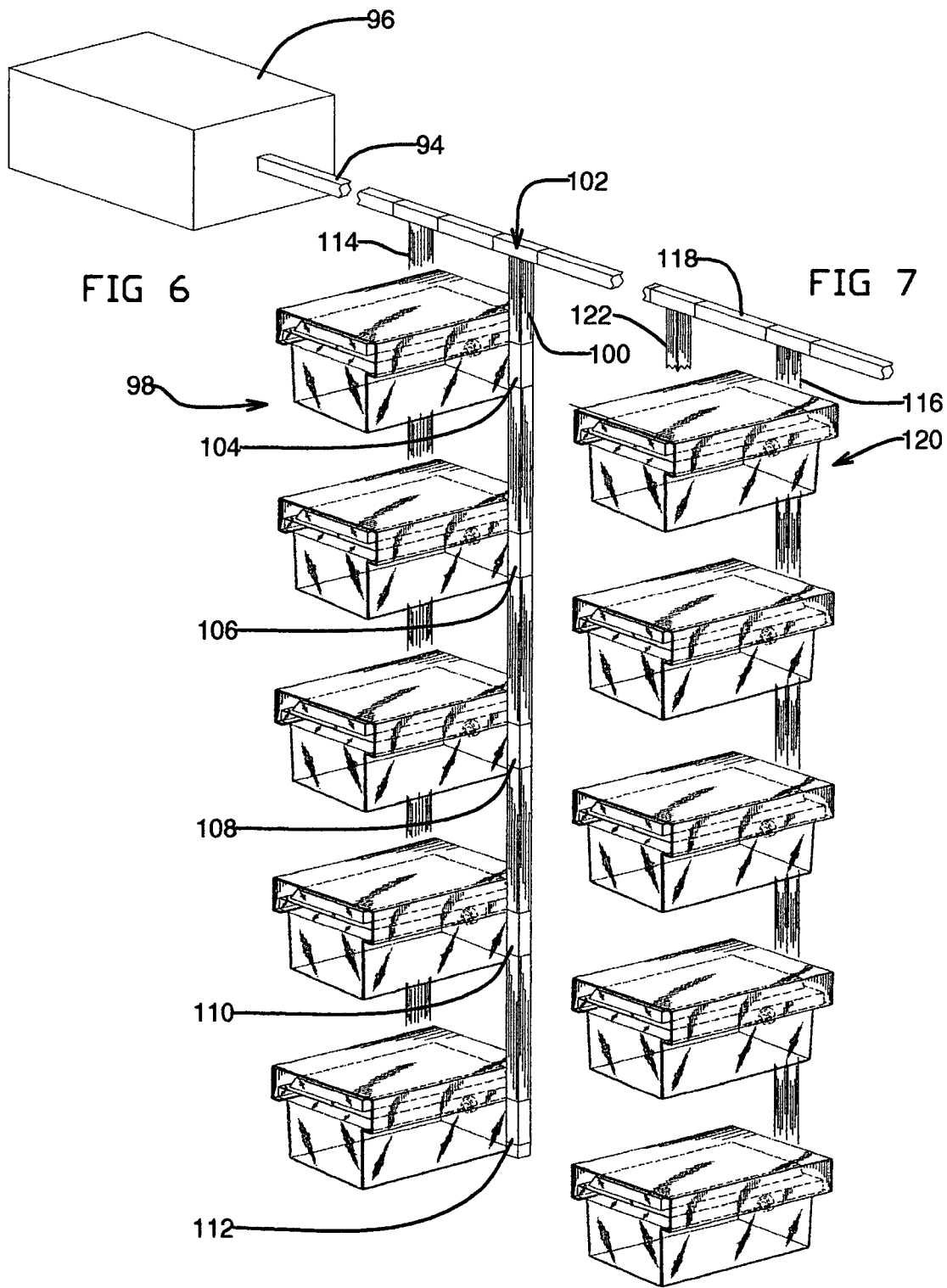

ANIMAL CAGE LIGHTING SYSTEM AND METHOD

FIELD OF THE INVENTION

This application claims the benefit of U.S. Provisional Application No. 60/368,110, filed Mar. 27, 2002. This invention relates to multiple cage systems for housing animals primarily for experimental purposes, and in particular to a system and method for lighting the cages for convenient viewing of the animals contained therein.

BACKGROUND OF THE INVENTION

In current medical research animals to be experimented upon, such as, for example, mice, rats, and guinea pigs, are housed in cages. The cages are often of the same size for convenience in stacking one upon another for placement within a central rack and cage support arrangement. Since medical research demands fairly large numbers of experimental data to be statistically significant, the number of animals and hence cages is also necessarily relatively large. Means are, of course, provided for adequate water supply and food for each animal, and access to each animal where required. However, often ambient room lighting is the only source of illumination for the cages themselves. Technicians may resort to the use of a flashlight, which is somewhat inconvenient and not always available. This may necessitate removing or opening each cage and manually handling the research animal, a time consuming and potentially hazardous procedure. Research data can also be skewed. The present invention addresses these problems, providing clear illumination of the animal(s) housed in each cage in an efficient and economical manner.

Some Objects of the Present Invention

It is therefore a primary object of the invention to provide clear illumination for animals housed in multiple cages.

A further object of the invention is to provide lighting directed to individual cages.

Still another object of the invention is to provide lighting of different colors to individual cages.

Yet another object of the invention is to provide lighting of different intensities to individual cages.

An additional object of the invention is to provide a light source for illuminating animal cages that can be easily removed, or left in place when the rack and cage support system is cleaned and/or sterilized, without danger to the lighting system.

Yet another additional object of one embodiment of the invention is to provide lighting utilizing LED or fiber optic devices which is easily moved and positioned within the rack area and where the LED or fiber optic devices remain positioned on the frame.

A still further additional object of another embodiment of the invention would be to provide lighting by mounting individual LEDs or fiber optic devices in each animal cage which are powered through an electrical receptacle or coupled to an external fiber optic device which would engage a plug portion in the cage to energize the LED or fiber optic device when the cage slides into a frame position.

These and other objects are obtained with the animal cage lighting system and method of the present invention.

In the housing of experimental laboratory animals a great deal of effort and ingenuity has been employed for caring for these animals, and the necessary cleaning procedures for the multiple cages. Surprisingly, little thought has been given to adequately lighting the individual cages. As noted above, technicians must often resort to flashlights or physically handle the cages and animals with potential danger to themselves or risk of skewing research data.

SUMMARY OF THE INVENTION

Towards the accomplishment of the above, a system for illuminating the interior of each of a plurality of animal cages to be positioned on a rack and cage arrangement wherein the rack has at least one cage arrangement. The arrangement includes a plurality of respective animal cage positions. A given system comprises a source of energy, i.e. either electrical energy or light energy. Means are provided to cooperatively engage the source of energy employed to thereby provide at least one respective portion of either the electrical energy or light energy and for transporting the energy (electrical conductors or fiber optic devices or cable) to respective predetermined locations in the rack and cage arrangement.

If electrical energy is transported, means such as LED devices for converting the transported electrical energy into respective portions of light energy are employed. The respective predetermined locations in the rack and cage arrangement correspond in number, at least, to the number of animal cages to be illumined. Each of the respective portions of light energy when located at a respective predetermined location in the cage and rack arrangement are suitable for illuminating the interior of a respective one of the animal cages when the respective one of the animal cages is in place in its respective position in the arrangement.

In a given system the source of energy can be detachably affixed to the rack and cage arrangement, so that it can be removed prior to when the rack and cage arrangement is to be cleaned or autoclaved.

In a given system the means for transporting and means for converting, for example, the LED devices, if required, can remain in place on the rack and cage arrangement when the rack and cage arrangement is to be cleaned and/or autoclaved.

One particular rack and cage arrangement which is improved by the present invention, includes a plurality of vertical cage arrangements juxtaposed one to the other such that a grid-like arrangement of animal cage positions results. Each animal cage position extends generally, longitudinally from a front plane to a rear plane; and extends generally, laterally from a first side plane to a second side plane. The respective predetermined locations where the light energy emanates are located generally at at least one of the intersections of the rear plane and side planes.

In another embodiment employing the teachings of the present invention, the respective predetermined locations where the light energy emanates are located generally in the rear plane, behind the respective animal cage when it is in its respective position.

In yet another embodiment employing the teachings of the present invention the respective predetermined locations where the light energy emanates are located generally in at least one of the side planes.

In a further embodiment, means for emitting light energy are disposed within each of the animal cages to be illuminated. In this embodiment, the respective portions of either the electrical energy or the light energy at the respective predetermined locations in the rack and cage arrangement, are coupled to the means for emitting light energy within each cage. In this embodiment, the means for emitting light energy could be an LED or fiber optic device.

Two systems for illuminating multiple animal cages are envisioned in the present invention. In the first system of the invention light emitting diodes or LED's are employed. LED's offer numerous advantages for this application. They can, for example, be battery operated systems; or powered by an ac to dc converter connected to a standard 120 volt electric outlet. The electrical source can be mounted and built in many variations to fit the requirements of various users. The LED light source (bar, strip, fixture, single LED) can be made in many variations of shape, size, intensity, color, and wiring method. For example, the electric wires can be external to the cage frame, inside the cage frame members, or a combination of both. The wiring can be a 2 wire or a 1 wire frame grounded as in a car system. As will be more fully explained, numerous advantages can be provided by an LED lighting system for each cage, including: the light color can be changed and/or varied (red LEDs can be employed, for example, which will allow "visibility" without disturbing the animals as may occur with "white" light); light can be directed to just the cage area, or more generally; the light source can be removed, or light system designed to withstand cleaning or sterilization to the cage shelf/rack unit without damage.

In the second adaptation of the present invention individual cage lighting is provided by fiber optic cables. A light source produces light which is directed into one end of the fiber optic cables which could be glass, plastic or other suitable material depending on requirements for cleaning, for example, temperature. As will be more fully explained, when positioned on multiple cage systems the fiber optic cable can snake through the shelf/rack framing until the area where the light is needed is reached. Light comes out of the end of the fiber optic cable and is directed where it is needed either directly or through a light distribution emitter or bar. Alternatively, fiber optic cables which emit light along their entire length can be employed when more general lighting is desired.

Still further, the cable can be cut and a diverter inserted. This will allow for the redirection of a percentage of the light as may be required.

A filter can be inserted in one or more cable lines or at the light source to reduce the intensity of the light if that is preferred or provide different colors.

Similar to the above described LED lighting system, fiber optic lighting sources can be mounted in various locations, not just on the top of the cage rack. This system can be remote or built-into other systems on the cage rack housing unit. Again, similar to LED's, fiber optic cables can be mounted external to cage framing, inside the frame members, or a combination of both. The fiber optic cables themselves can be single thin fiber, multiple fiber bundles, a single thick fiber, a fiber that conveys light without light lost to sides, a fiber that projects light along its sides, and a light fiber with "T's" to split light from its main runner off to branches. Advantages of fiber optic lighting again are similar to those of LED's, including: lighting integral to animal housing rack or shelf; lighting is directed to individual cages; lighting can be provided in different colors; lighting can be provided in different intensities; light source can be removed and the cage/rack unit washed and/or sterilized with light fibers and light emitters in place without damaging the lighting system.

BRIEF DESCRIPTION OF THE DRAWINGS

FIGS. 6 and 7 are schematic views similar to FIG. 4 showing alternative fiber optic individual cage lighting systems comprising a single fiber optic cable.

DETAILED DESCRIPTION

Figure 1:
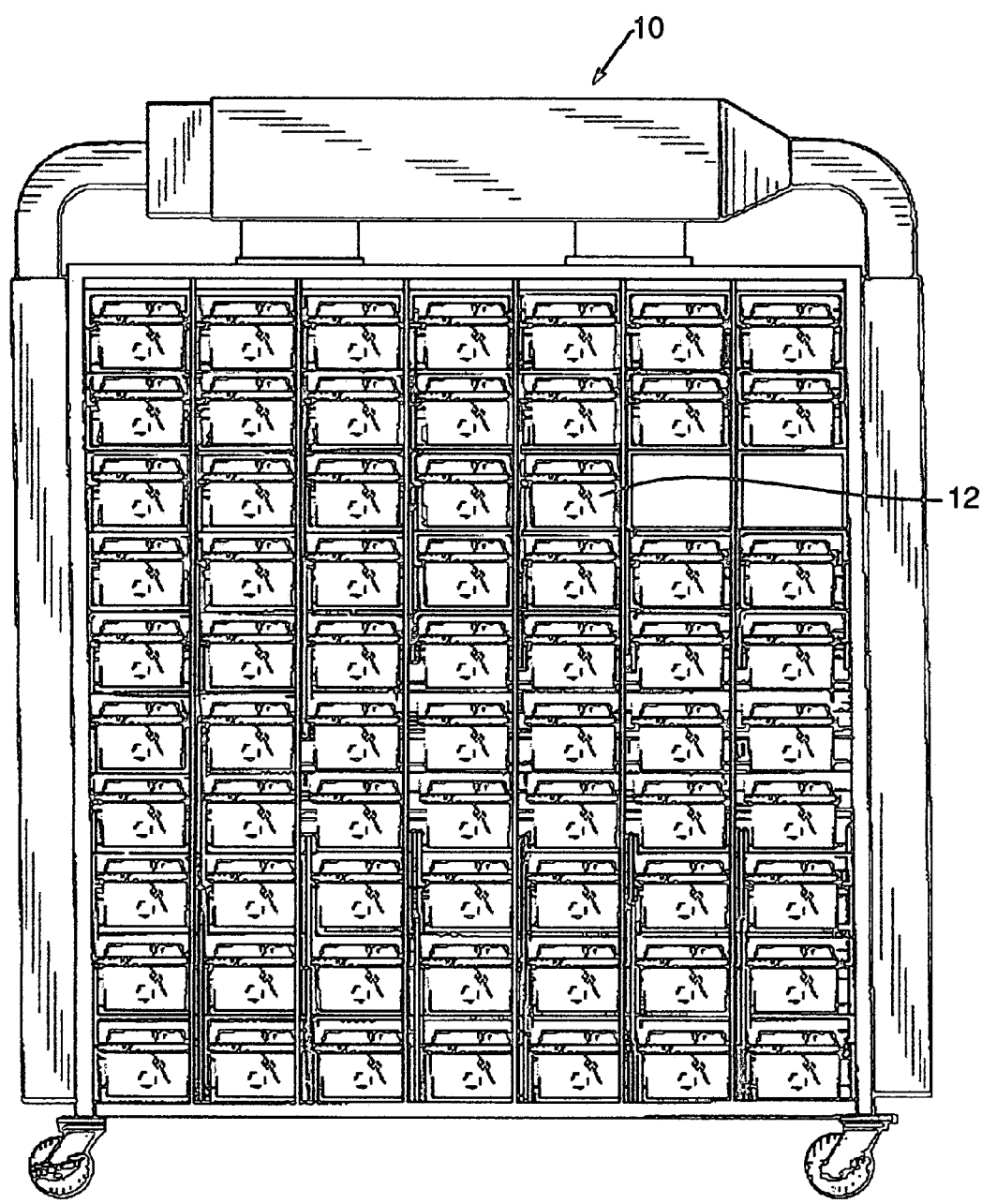
FIG. 1 is a perspective view of a rack and cage arrangement with animal cages in position.

Turning now to the drawings in which similar structures having the same function are denoted with the same numerals, in FIG. 1 a typical rack and cage arrangement 10 for housing laboratory animals is shown. Animal cages 12 are stacked in vertical cage arrangements, in respective cage positions.

Figure 2:
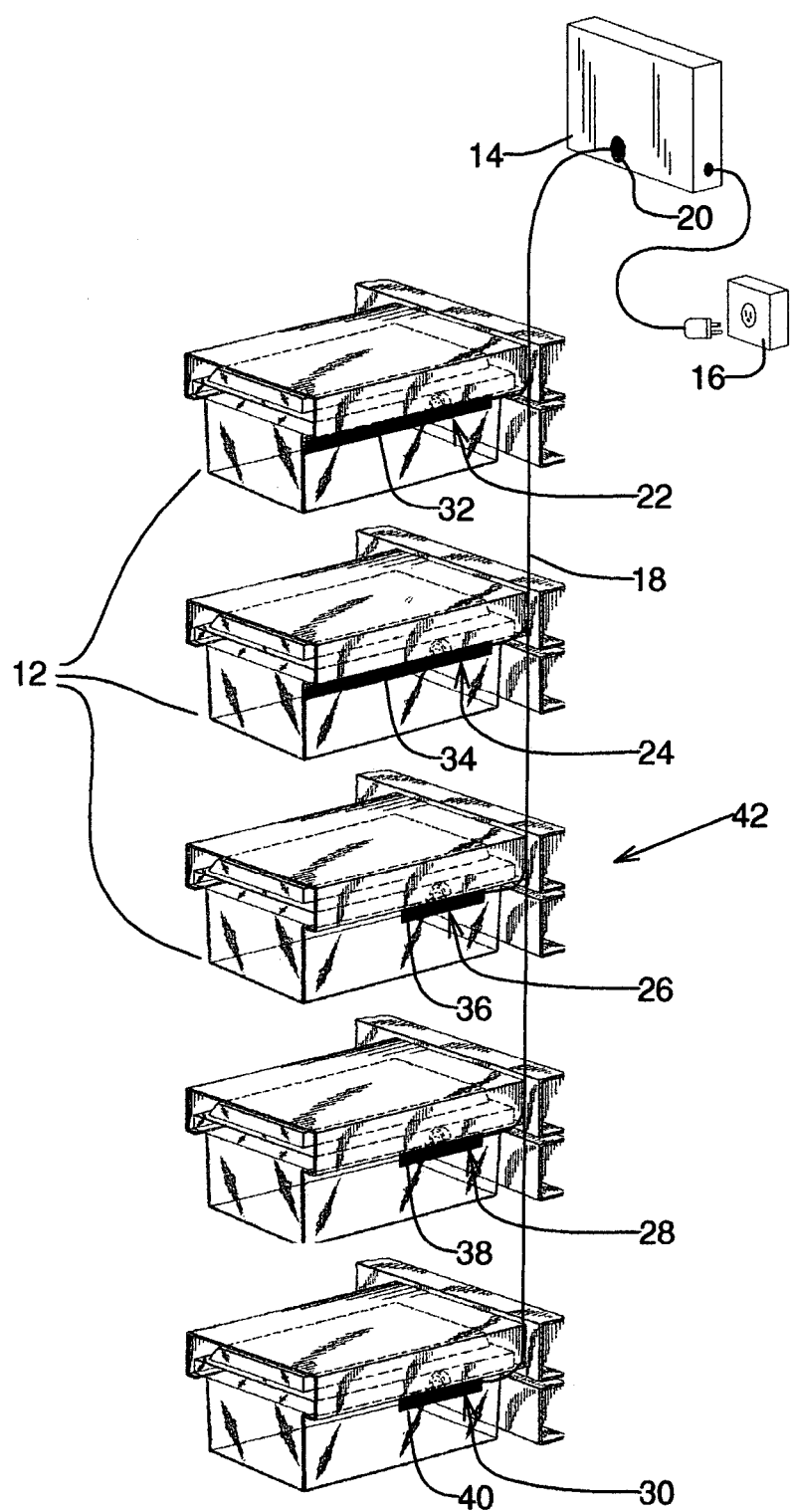
FIG. 2 is an exploded schematic view of a vertical column of cages showing one embodiment implementing the principles of the invention.

In FIG. 2, a source of DC electrical energy, converter power supply, 14 is connected to a source of AC power, 120/220v, 50/60 HZ at outlet 16.

A single or multiple lead cable 18 cooperatively engages the power supply 14 through an appropriate connector 20. The cable 18 conducts the electrical energy provided by the power supply to respective predetermined locations, for example, 22, 24, 26, 28, and 30, throughout the rack and cage arrangement 10.

At each predetermined location, a device to convert the electrical energy into light energy is appropriately positioned to illuminate the interior of the animal cage in place on its corresponding location. In FIG. 2 such devices for converting electrical energy are shown as a series of LED strips, 32, 34, 36, 38, and 40.

In FIG. 2 these strips are shown, for illustration purposes, to vary in length although of course, they might be of the same length or of different configuration. Such devices are available from numerous suppliers including LEDTRONICS, INC. in Torrance, Calif.

The LED strips typically would be secured at each location to the rack frame (not shown for clarity purposes). Although positioned in FIG. 2 in the plane separating two juxtaposed, vertical cage arrangements, it should be apparent that the Led devices could be positioned at other locations depending on the user's needs and the particular rack configuration. So for example, the LED devices could be positioned in a plane at the rear 42 of the cage position at respective positions such that they could illumine the interior of an associated animal cage. Of course, such devices could be positioned in both side planes, each directed towards the same animal cage, as well as other appropriate locations.

Although a power pack is described as a source of electrical energy, alternative sources of energy suitable for such devices, for example, batteries, can also be employed.

The LED devices and routing cable 18 that are employed can be selected for their imperviousness to the anticipated cleaning environment, including sterilization procedures such as autoclaving. By simply removing the power supply 14, if physically affixed to the rack and cage arrangement, the activity of cleaning and/or sterilizing is facilitated.

The LED strips can include LEDs of different color as may be dictated by the physiological sensitivities of the research animal. So for example, alternating white and red LED lamps in a single strip may be of an advantage where the research animals are mice. Whatever the need, LED devices as applied herein employing the principles of the invention, provide a great degree of flexibility in illuminating the subject creatures heretofore not experienced in this field.

Figure 3:
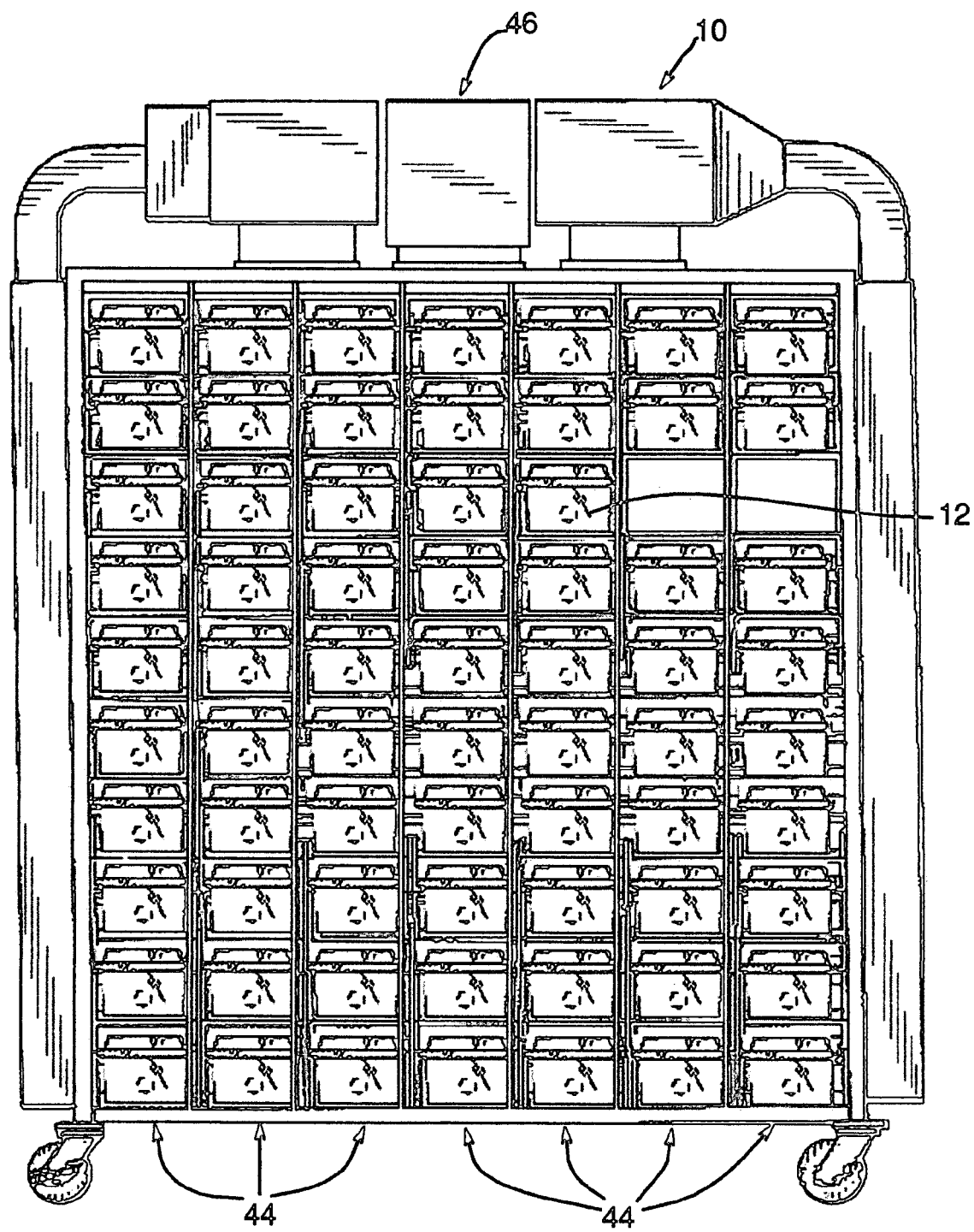
FIG. 3 is a perspective view of a rack and cage arrangement with cages similar to FIG. 1, illustrating yet another embodiment of the present invention.

FIG. 3 illustrates another embodiment of the illuminating system of the present invention. A rack and cage arrangement 10 is shown including a plurality of animal cages 12 disposed in respective positions in juxtaposed vertical cage arrangements 44.

Detachably affixed to the top of the rack and this cage arrangement is a source of light energy, light generator 46. These generators, available typically as halogen or metal halide units are provided in various wattages, for example in the range of 10 to 250 watts. A suitable generator for this application is available through VISUAL LIGHTING TECHNOLOGIES located in Mission Viejo. Calif.

Figure 4:
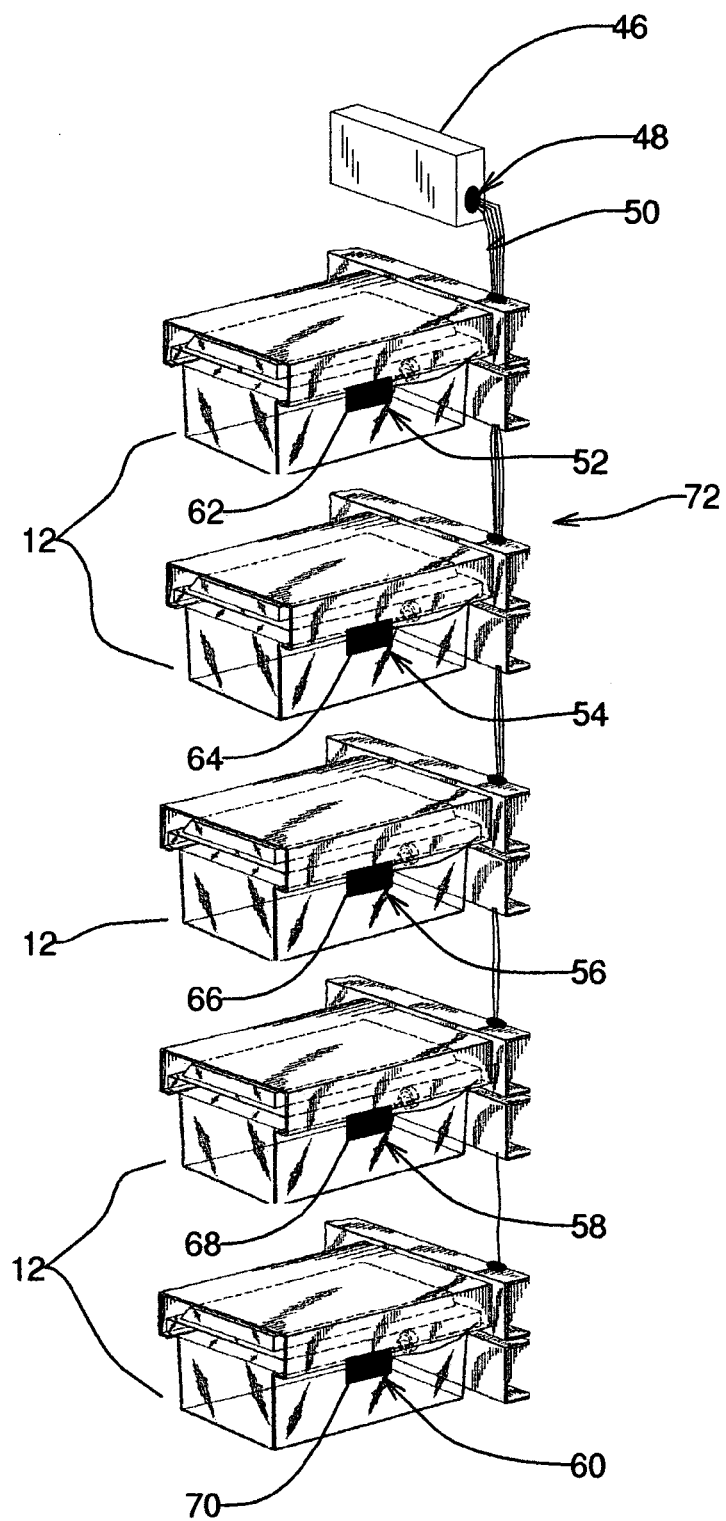
FIG. 4 is an exploded schematic view of a vertical column of cages showing still another embodiment of the present invention.

In FIG. 4, a coupling device 48 cooperatively engages the source 46 to thereby provide access to the bundle of strands 50 of optical fiber and to channel light energy thereto in accordance with known techniques. The individual fiber strands in the bundle 50 transport its respective proportion of light energy to respective predetermined locations, for example, 52, 54, 56, 58, and 60 in the rack and cage arrangement.

At the terminus of respective cables, at the predetermined locations, such as 52, 54, 56, 58, and 60 suitable light fittings 62, 64, 66, 68, and 70 are employed to illuminate the interior of a respective animal cage in place in its respective position. As illustrated the light fittings are positioned in a side plane adjacent to the animal cage cubicle. The light fittings would be secured to the rack in an appropriate fashion, not shown for clarity purposes. As with the embodiment employing LEDs, it should be apparent that the flexibility afforded by the ability to route the fiber optic cable as the user deems necessary, the fiber optic light fittings could be positioned at other locations. So for example they could be positioned in a plane 72 at the rear of the cage arrangement, at respective positions such that they could illuminate the interior of an associated animal cage. Still further, as above, such light fittings could be positioned in both side planes, each directed towards the same animal cage, as well as other appropriate locations identifiable by the end user.

Although the embodiment is described as employing light fittings for directing the light energy at the terminus of each cable, fiber optic technology offers various other techniques for exposing and directing the light energy, readily apparent, which can implement the purposes of the invention.

The fiber optic cable and light fittings and coupling device, 48, can be selected for their imperviousness to the anticipated cleaning environment, including sterilization procedures such as autoclaving.

Figure 5:
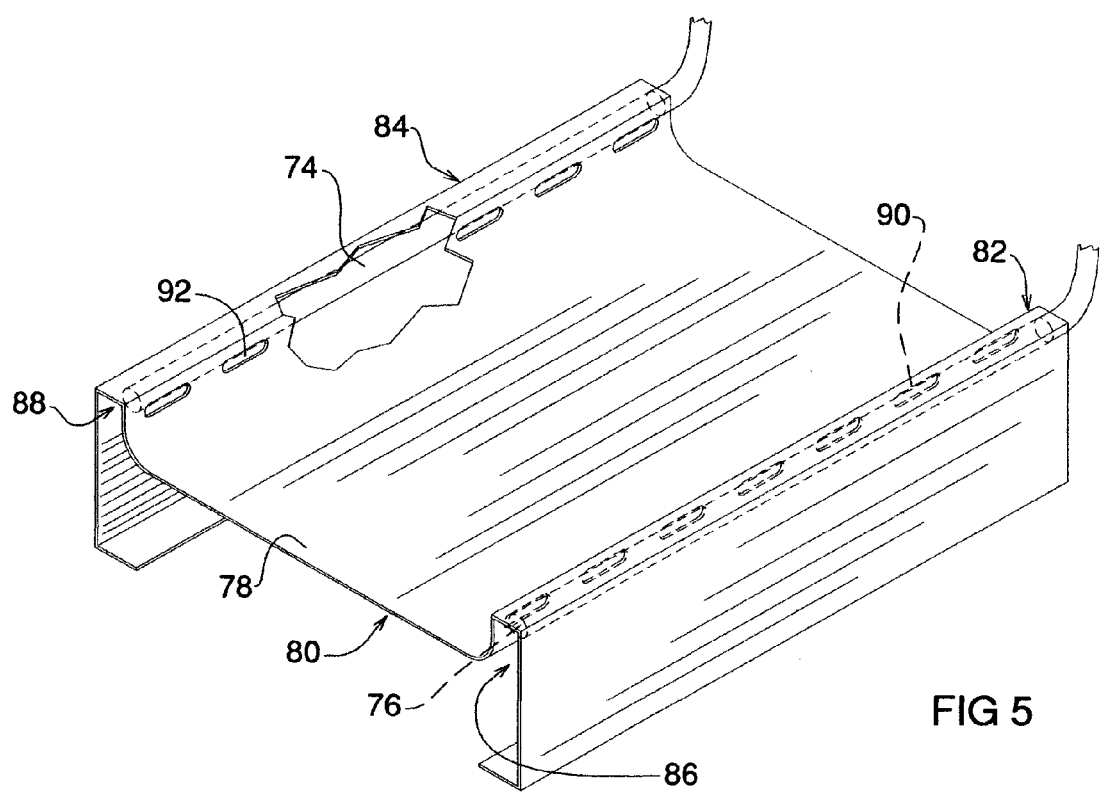
FIG. 5 is a perspective view of a tray which supports a cage, showing an adaptation of the embodiment of FIG. 4.

In FIG. 5, the inventors illustrate one approach, using fiber optic cables 74 and 76, for illuminating, from both sides an animal cage in position. The cage, not shown, when positioned in the rack and cage arrangement would rest on surface 78 of saddle 80. The saddle includes upwardly expending side members 82 and 84. These side members are formed having respective channels 86, 88 into which the termini of cables 74 and 76 are positioned and secured in an acceptable way. The inwardly positioned sides of the channels include slotted openings, for example, 90 and 92, through which light energy is directed so as to illuminate the interior of the animal cage when it is in place.

As with the LED devices, the color of the illuminating light energy can be altered by suitable filters at the light source, or at individual predetermined locations using suitable light fittings.

Also attenuators and other known techniques can be employed to alter the intensity of the emitting light as may be required.

FIGS. 6 and 7 depict applications employing principles of the present invention where solid core, fiber optics devices may be employed.

In FIG. 6, a rectangular fiber optic device or cable 94 is shown coupled through a suitable coupling to light source 96. For the application shown the rectangular cable is disposed along the top of a rack and cage arrangement such as depicted in FIG. 3. At the juxtaposition of adjacent vertical cage arrangements such as 98, a vertically descending fiber optic cable 100 is "T" coupled in a known way at 102 to the horizontally disposed cable 94. Cable 100 is shown positioned at the rear corner where a side plane and rear plane defining the cage positions would intersect. If the purpose of the cable 100 is to provide light energy at the locations in the rack and cage arrangement where the individual cages are to be positioned, and not generally lighting, optimally cables 94 and 100 would be clad, except for the specific locations where light energy is to be emitted, for example 104, 106, 108, 110, and 112. These locations can be bared on those sides where the user decides it is important to direct the emitted light energy. As illustrated this would be on three sides, including the side immediately adjacent the animal cages depicted.

A further vertically descending cable, 114 is positioned in the other rear corner for similar purposes.

FIG. 7 illustrates an alternate application where a vertically descending solid core, fiber optic cable is employed. Here a cable 116 descends from a "T" coupling with horizontally disposed cable 118. Cable 116 descends in a plane to the rear 120 of the cages when in position. If it is the user's intention, the cable 116 can be clad except at the location where each cage is positioned, where it is removed to allow light to emit so as to illuminate the interior of the cage. In current rack and cage arrangements, back to back systems are employed so that removal of the clad on the opposite face of the cable 116 would allow illumination of the interior of the cages in the rear rack and cage system.

Cable 122 cooperates in a similar fashion with the vertical cage arrangement (not shown) juxtaposed with the one illustrated.

Figure 8:
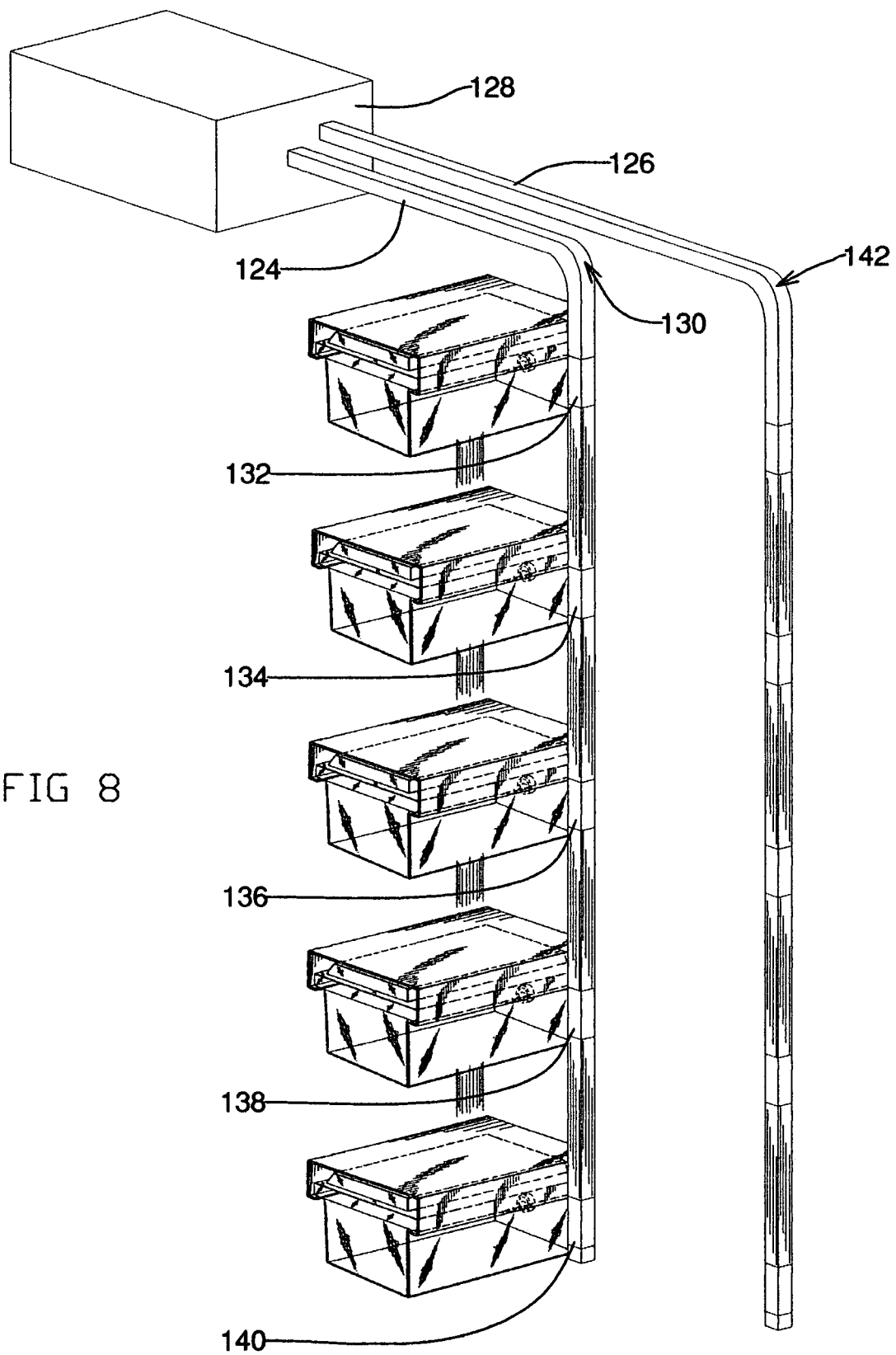
FIG. 8 depicts an alternative arrangement to that disclosed in FIGS. 6 and 7 using a single fiber optic cable.

FIG. 8 is an alternate enablement of the embodiment of FIG. 6. Here individual fiber optic cables 124 and 126 are coupled to light source 128. Again as illustrated the light source 128 and the first run of cables 124 and 126 are horizontally disposed. Cable 124 is sufficiently pliable to permit a flexing at point 130 where the cable descends in a vertical fashion similar to cable 100 in FIG. 6. The cable is positioned in relation to the rack and cage arrangement as was described with respect to FIG. 6. Windows in the cable's clad covering 132, 134, 136, 138, and 140 function identically to locations 104–112 described above.

Cable 126 extends outwardly further from light source 128 before it descends vertically after bending at 142. As with cable 114, it would be positioned in the right rear corner of the immediately adjacent vertical cage arrangement, not shown.

Similarly the adaptation of FIG. 8 can allow for positioning of the vertically descending cables to the rear of the cage positions as explained above in relation to FIG. 7.

Figure 9:
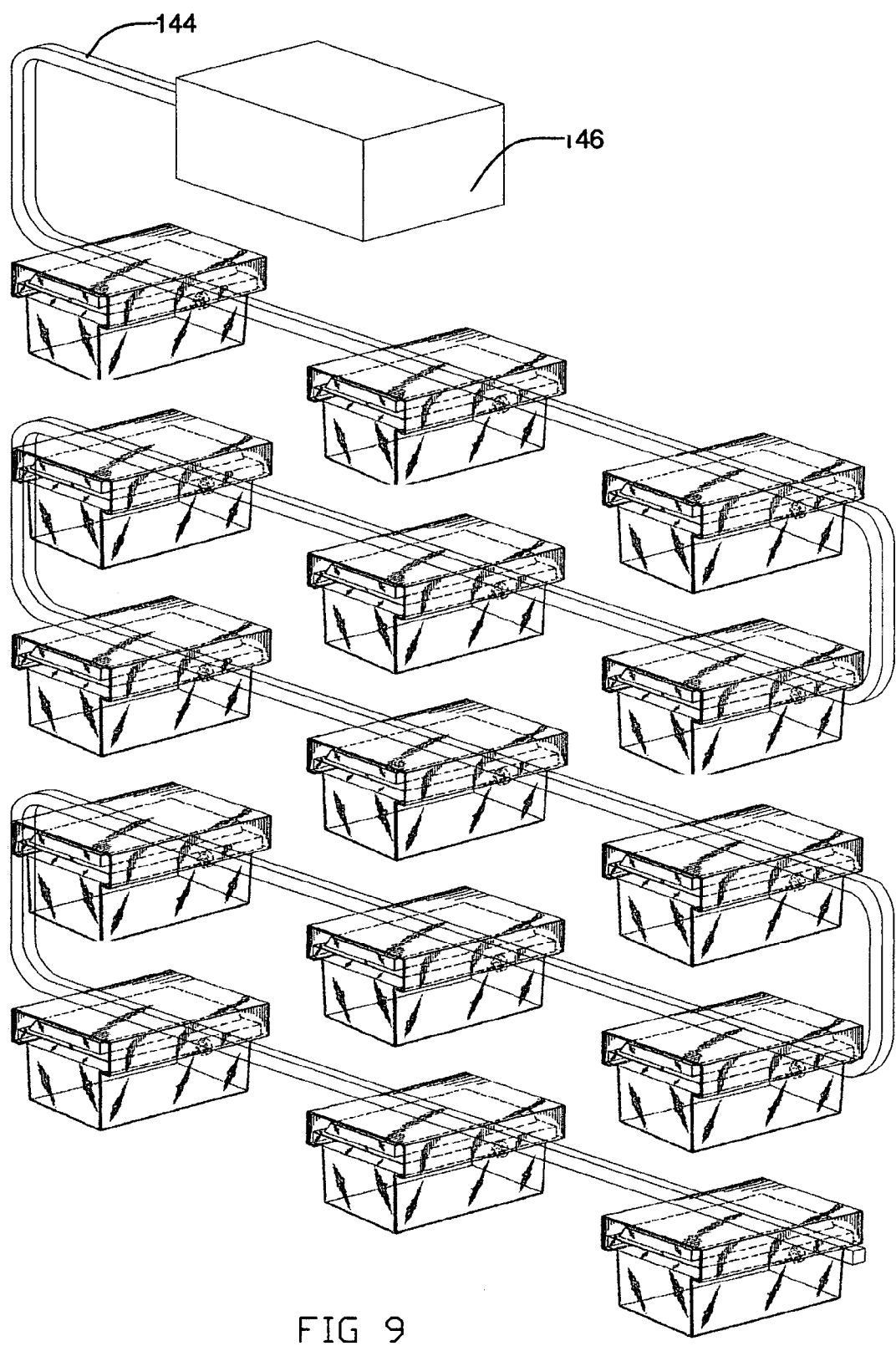
FIG. 9 depicts yet another embodiment implementing the principles of the present invention.

FIG. 9 depicts still another embodiment of the principles of the present invention. Here a flexible fiber optic cable 144 is coupled to light source 146. The source 146 can be positioned on the top of the rack. The cable 144 emanates from the source initially in a horizontal direction and then follows a serpentine path as it traverses behind (in this depiction) each of the cages positioned the rack and cage arrangement shown. The flexible cable can be shorn of all cladding such that it can provide a back-drop curtain of light; or have the cladding removed at specific locations, for example, behind each cage or cages if a back to back rack system is involved.

Generally the LED configuration more specifically described above with respect to FIGS. 1 and 2, could also be employed in the serpentine layout depicted in FIG. 9, with the LED devices positioned where the needs of the user dictate.

Figure 10:
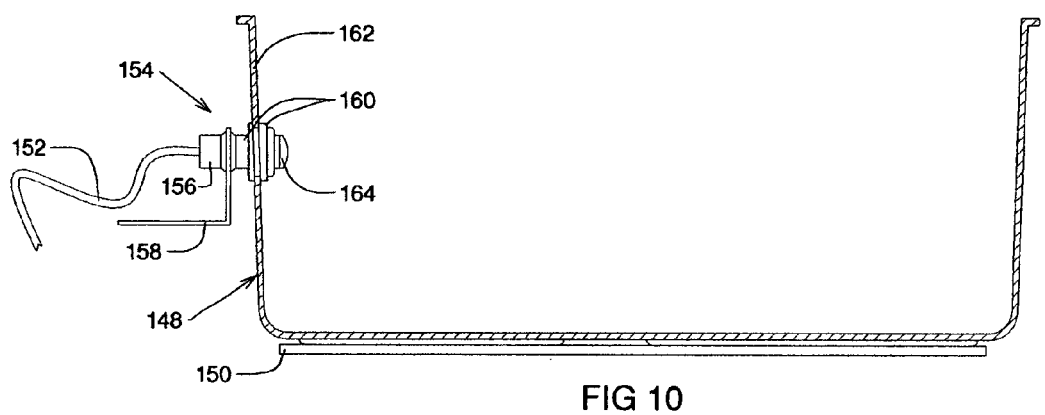
FIGS. 10 and 11 depict embodiments employing principles of the present invention where the means for emitting light energy are disposed within each of the animal cages.
Figure 11:
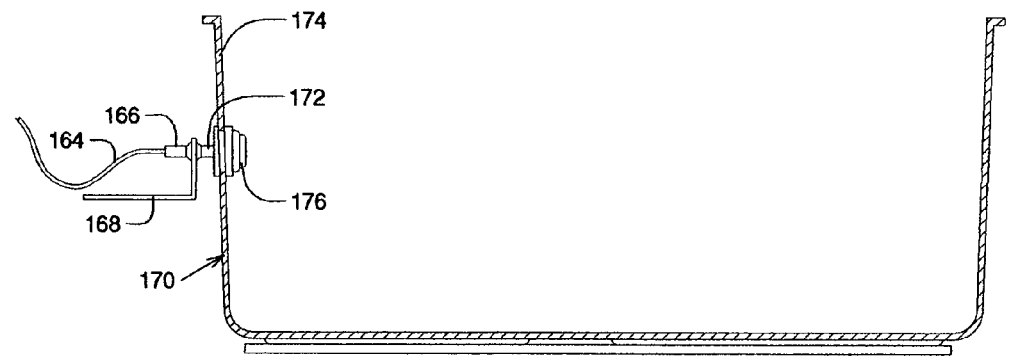

FIGS. 10 and 11 depict still another adaptation of the principles of the present invention. In FIG. 10, the bottom portion 148 of a typical animal cage is shown supported on a shelf plate 150. A cable 152 carrying electric energy from a power source such as 14 in FIG. 2 is brought to a predetermined location typically at the rear 154 of a cage cubicle. The cable 152 is terminated in a suitable connector 156 which is rigidly secured by bracket 158 or the like to the rack structure, not shown.

The cage bottom 148 includes a coupling connector 160 which is secured to the rear wall 162. Electrically connected to connector 160 is a light emitting device such as LED 164, which is also physically restrained in a set position. When the cage including bottom portion 148 is positioned in its cubicle in the rack and cage arrangement, the position of the connector portions 156 and 160 are aligned and axially restrained so that a secure electrical connection can be made. Now when electric energy is supplied to cable 152, the emitting device 164 will light and illuminate the cage.

In FIG. 11 the principle is the same except a fiber optic system is depicted. Here a fiber optic cable 164 is brought to the predetermined location, behind a particular cage cubicle. The cable 164 terminates in a suitable coupling 166 which is secured to the rack frame, not shown, by bracket 168. Cage bottom 170 includes a fiber optic mating coupling 172 for coupling 166. Coupling 172 is secured to the side wall 174 of the cage bottom 170. Coupled to coupling 172 is a suitable fiber optic light fitting 176. When the cage including bottom portion 170 is positioned in its cubicle in the rack and cage arrangement, the position of the connector portions 166 and 172 are aligned and axially restrained so that a secure coupling is provided so as to minimize the loss of light energy. Now when the light source such as 46 in FIG. 3 is energized, the light fitting 176 will emit light energy as dictated by its characteristics.

Many other changes could be made to the invention and its numerous embodiments described above without departing from the spirit thereof. The flexibility of the LED wiring or fiber optic cable systems described herein and the devices themselves, permit almost an infinite number of strategies for lighting up the rack and cage arrangements used for animal research. The versatility shown will permit readjustments as necessary to optimize the characteristics of a given system.

The potential for such changes within the breadth of the invention will only be limited by the scope of the appended claims.

What is claimed is:

1. A system for illuminating the interior of each of a plurality of animal cages to be positioned on a rack and cage arrangement wherein the rack has at least one cage arrangement, said arrangement including a plurality of respective animal cage positions, the system comprising:
   (a) a source of energy selected from a group consisting of electrical energy or light energy in the visible spectrum;
   (b) means adapted to cooperatively engage said source of energy to thereby provide at least one respective portion of either said electrical energy or said light energy in the visible spectrum;
   (c) means for transporting said at least one respective portion of either said electrical energy or said light energy in the visible spectrum to respective predetermined locations in the rack and cage arrangement; and,
   (d) means for converting said respective portions of said energy, if said respective portions of said energy are electrical energy, into respective portions of light energy in the visible spectrum,
   said respective predetermined locations in the rack and cage arrangement corresponding in number, at least, to the number of animal cages to be illumined, each of said respective portions of light energy in the visible spectrum when located at a respective predetermined location in said cage and rack arrangement suitable for illuminating the interior of a respective one of the animal cages when the respective one of the animal cages is in place in its respective position in said arrangement so that an observer can view an interior of respective ones of the illumined cages so as to visually observe the animal and contents within a respective cage, the system adaptable to simultaneously and continuously illumine the interior of all animal cages positioned on the rack and cage arrangement if required.

2. The system for illuminating claimed in claim 1 wherein said source of energy is detachably affixed to the rack and cage arrangement, wherein said source of energy can be removed prior to when the rack and cage arrangement is to be cleaned.

3. The system for illuminating claimed in claim 1 wherein said source of energy is detachably affixed to the rack and cage arrangement, wherein said source of energy can be removed prior to when the rack and cage arrangement is to be autoclaved.

4. The system for illuminating claimed in claim 1 wherein said means for transporting and said means for converting, if required, remain in place on the rack and cage arrangement when the rack and cage arrangement is to be cleaned and/or autoclaved.

5. The system for illuminating claimed in claim 1, wherein the rack and cage arrangement includes a plurality of vertical cage arrangements juxtaposed one to the other such that a grid-like arrangement of animal cage positions results, each animal cage position extending generally, longitudinally from a front plane to a rear plane and extending generally, laterally from a first side plane to a second side plane, said respective predetermined locations located generally at at least one of the intersections of the rear plane and side planes.

6. The system for illuminating claimed in claim 1, wherein the rack and cage arrangement includes a plurality of vertical cage arrangements juxtaposed one to the other such that a grid-like arrangement of animal cage positions results, each animal cage position extending generally, longitudinally from a front plane to a rear plane and extending generally, laterally from a first side plane to a second side plane, said respective predetermined locations located generally in the rear plane, behind the respective animal cage when it is in its respective position.

7. The system for illuminating claimed in claim 1, wherein the rack and cage arrangement includes a plurality of vertical cage arrangements juxtaposed one to the other such that a grid-like arrangement of animal cage positions results, each animal cage position extending generally, longitudinally from a front plane to a rear plane and extending generally, laterally from a first side plane to a second side plane, said respective predetermined locations located generally in at least one of said side planes.

8. The system for illuminating claimed in claim 1, wherein means for emitting light energy in the visible spectrum are disposed within each of the animal cages to be illuminated and wherein means for coupling said respective portions of either said electrical energy or said light energy in the visible spectrum to respective predetermined locations in the rack and cage arrangement, to respective ones of said means for emitting light energy in the visible spectrum is provided.

9. The system for illuminating claimed in claim 8, wherein said means for emitting light energy in the visible spectrum is at least one LED.

10. The system for illuminating claimed in claim 8, wherein said means for emitting light energy in the visible spectrum is at least one fiber optic device.

11. The system for illuminating claimed in either claim 1, 2, 3, 4, 5, 6 or 7 wherein said source of energy is a source of electrical energy, and wherein said means for converting said respective portions of light energy in the visible spectrum is at least one LED.

12. The system for illuminating claimed in either claim 1, 2, 3, 4, 5, 6 or 7 wherein said source of energy is a source of light energy in the visible spectrum, and wherein said means for transporting said respective portions of light energy in the visible spectrum is at least one fiber optic device.

13. A system for illuminating the interior of each of a plurality of animal cages to be positioned on a rack and cage arrangement wherein the rack has at least one cage arrangement, the arrangement including a plurality of respective animal cage positions, the system comprising:
 (a) a source of electrical energy;
 (b) means adapted to cooperatively engage said source of electrical energy to thereby provide at least one respective portion of said electrical energy;
 (c) means for transporting said at least one respective portion of said electrical energy along a prescribed path within the rack and cage arrangement; and,
 (d) means for converting said at least one respective portion of said electrical energy into at least one respective segment of light energy in the visible spectrum at at least one location along said prescribed path, said means for converting including at least one LED, wherein
 said light energy in the visible spectrum is sufficient for illuminating the interior of the animal cages when in place in their respective positions in said arrangement so that an observer can view an interior of respective ones of the illumined cages so as to visually observe the animal and contents within a respective cage, the system adaptable to simultaneously and continuously illumine the interior of all animal cages positioned on the rack and case arrangement, if required.

14. A system for illuminating the interior of each of a plurality of animal cages to be positioned on a rack and cage arrangement wherein the rack has at least one cage arrangement, said arrangement including a plurality of respective animal cage positions, the system comprising:
 (a) a source of light energy in the visible spectrum;
 (b) means adapted to cooperatively engage said source of light energy in the visible spectrum to thereby provide at least one respective portion of said light energy in the visible spectrum; and,
 (c) means for transporting said at least one respective portion of said light energy in the visible spectrum along a prescribed path within the rack and cage arrangement, said means for transporting including at least one fiber optic device, said means for transporting adapted to provide at at least one location along said path, a segment of said at least one respective portion of said light energy in the visible spectrum, said segment of light energy in the visible spectrum sufficient for illuminating the interior of the animal cages when in place in their respective positions in said arrangement so that an observer can view an interior of respective ones of the illumined cages so as to visually observe the animal and contents within a respective cage, the system adaptable to simultaneously and continuously illumine the interior of all animal cages positioned on the rack and case arrangement if required.

15. A method for illuminating the interior of each of a plurality of animal cages to be positioned on a rack and cage arrangement wherein the rack has at least one cage arrangement, said arrangement including a plurality of respective animal cage positions, comprising the steps of:
 (a) providing a source of electrical energy;
 (b) cooperatively engaging said source of electrical energy to thereby provide at least one respective portion of said electrical energy;
 (c) transporting said at least one respective portion of said electrical energy to respective predetermined locations in the rack and cage arrangement; and,
 (d) converting said respective portions of said electrical energy into respective portions of light energy in the visible spectrum, said step of converting including powering at least one LED by each of said respective portions of said electrical energy, said respective predetermined locations in the rack and cage arrangement corresponding in number, at least, to the number of animal cages to be illumined, each of said respective portions of light energy in the visible spectrum when located at a respective predetermined location in said cage and rack arrangement suitable for illuminating the interior of a respective one of the animal cages when the respective one of the animal cages is in place in its respective position in said arrangement so that an observer can view an interior of respective ones of the illumined cages so as to visually observe the animal and contents within a respective cage the method adaptable to simultaneously and continuously illumine the interior of all animal cages positioned on the rack and cage arrangement, if required.

16. A method for illuminating the interior of each of a plurality of animal cages to be positioned on a rack and cage arrangement wherein the rack has at least one cage arrangement, said arrangement including a plurality of respective animal cage positions, comprising the steps of:

(a) providing a source of light energy in the visible spectrum;
(b) cooperatively engaging said source of light energy in the visible spectrum to thereby provide at least one respective portion of said light energy in the visible spectrum; and,
(c) transporting by at least one fiber optic device said at least one respective portion of said light energy in the visible spectrum to respective predetermined locations in the rack and cage arrangement, said respective predetermined locations in the rack and cage arrangement corresponding in number, at least, to the number of animal cages to be illumined, each of said respective portions of light energy in the visible spectrum when located at a respective predetermined location in said cage and rack arrangement suitable for illuminating the interior of a respective one of the animal cages when the respective one of the animal cages is in place in its respective position in said arrangement so that an observer can view an interior of respective ones of the illumined cages so as to visually observe the animal and contents within a respective cage, the method adaptable to simultaneously and continuously illumine the interior of all animal cages positioned on the rack and cage arrangement, if required.

17. A method for illuminating the interior of each of a plurality of animal cages to be positioned on a rack and cage arrangement wherein the rack has at least one cage arrangement, the arrangement including a plurality of respective animal cage positions, comprising the steps of:
(a) providing a source of electrical energy;
(b) cooperatively engaging said source of electrical energy to thereby provide at least one respective portion of said electrical energy;
(c) transporting said at least one respective portion of said electrical energy along a prescribed path within the rack and cage arrangement; and,
(d) converting said at least one respective portion of said electrical energy into at least one respective segment of light energy in the visible spectrum at at least one location along said prescribed path, said step of converting including powering at least one LED by said at least one respective portion of said electrical energy, wherein said light energy in the visible spectrum is sufficient for illuminating the interior of the animal cages when in place in their respective positions in said arrangement so that an observer can view an interior of respective ones of the illumined cages so as to visually observe the animal and contents within a respective cage, the method adaptable to simultaneously and continuously illumine the interior of all animal cages positioned on the rack and cage arrangement, if required.

18. A method for illuminating the interior of each of a plurality of animal cages to be positioned on a rack and cage arrangement wherein the rack has at least one cage arrangement, the arrangement including a plurality of respective animal cage positions, comprising the steps of:
(a) providing a source of light energy in the visible spectrum;
(b) cooperatively engaging said source of light energy in the visible spectrum to thereby provide at least one respective portion of said electrical energy;
(c) transporting said at least one respective portion of said light energy in the visible spectrum along at least one fiber optic device disposed in a prescribed path within the rack and cage arrangement said fiber optic device adapted to provide at at least one location along said path, a segment of said at least one respective portion of said light energy in the visible spectrum, wherein said light energy in the visible spectrum is sufficient for illuminating the interior of the animal cages when in place in their respective positions in said arrangement so that an observer can view an interior of respective ones of the illumined cages so as to visually observe the animal and contents within a respective cage the method adaptable to simultaneously and continuously illumine the interior of all animal cages positioned on the rack and case arrangements if required.

19. The methods claimed in either claim 15, 16, 17 or 18 further comprising the step of detachably affixing the source of electrical or light energy in the visible spectrum to the rack and cage arrangement such that said source of electrical or light energy in the visible spectrum can be removed prior to when the rack and cage arrangement is to be cleaned or autoclaved.

20. The method claimed in claim 15, wherein said at least one LED is located within a respective animal cage, further comprising the step of coupling said respective portions of said electrical energy to said at least one LED.

21. The method claimed in claim 16, wherein at least an additional fiber optic device is located within a respective animal cage, further comprising the step of coupling said respective portions of said light energy in the visible spectrum at said respective locations to said additional fiber optic device.

* * * * *

UNITED STATES PATENT AND TRADEMARK OFFICE
CERTIFICATE OF CORRECTION

PATENT NO. : 6,953,266 B1
DATED : October 11, 2005
INVENTOR(S) : Richard Ver Hage and Glenn Ver Hage It is certified that error appears in the above-identified patent and that said Letters Patent is hereby corrected as shown below:

Column 12,
Line 30, change "case" to -- cage --.

Signed and Sealed this

Seventh Day of February, 2006

JON W. DUDAS
*Director of the United States Patent and Trademark Office*